(12) United States Patent
Nuthalapati

(10) Patent No.: US 8,380,770 B1
(45) Date of Patent: Feb. 19, 2013

(54) MISMATCHED FILTERS FOR LONG BINARY CODES

(75) Inventor: Rao Nuthalapati, Delran, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 954 days.

(21) Appl. No.: 12/463,794

(22) Filed: May 11, 2009

(51) Int. Cl.
*G06F 17/10* (2006.01)
*G06F 3/00* (2006.01)
(52) U.S. Cl. .................. 708/300; 710/2; 710/5; 710/8
(58) Field of Classification Search .................. None
See application file for complete search history.

(56) References Cited

U.S. PATENT DOCUMENTS

| 7,492,312 | B2 | 2/2009 | Fam et al. | |
|---|---|---|---|---|
| 2005/0171986 | A1* | 8/2005 | Denk et al. | 708/200 |
| 2007/0036345 | A1* | 2/2007 | Usman et al. | 379/406.08 |

OTHER PUBLICATIONS

F. J. Harris, "On the Use of Windows for Harmonic Analysis with Discrete Fourier Transform", Proc. IEEE, vol. 66, No. 1, pp. 51-83, Jan. 1978.
J. Baden and M. Cohen, "Optimal Peak Sidelobe Filters and Biphase Pulse Compression", I Proc. IEEE International Radar Conference, May 1990, pp. 249-252.
S. Zoraster, "Minimum Peak Range Sidelobe Filters for Binary Phase-Coded Waveforms", IEEE Trans, Aerospace & Electronic Systems, vol. AES-16, No. 1., Jan. 1980, pp. 112-115.
S. Park and J. Doherty, "A Minimax Optimization Approach to Sidelobe Suppression Filter Design", IEEE International Conference on Acoustics, Speech and Signal Processing, vol. 6, May 1996, pp. 3113-3116.
B. Zrnic, A. Zejak, A. Petrovic and J. Simic, "Range sidelobe suppression for pulse compression radars utilizing modified RLS algorithm", in Proc. IEEE International Symposium on Spread Spectrum Techniques and Applications, vol. 3, Sep. 1998, pp. 1008-1011.
S. Haykin, "Adaptive Filter Theory", Chp. 13, entitled "Recursive Least-Squares Algorithm", pp. 562-588, Prentice Hall, Inc., 1996.
A. W. Rihaczek and R. M. Golden, "Range Sidelobe Suppression for Barker Codes", IEEE Trans. Aerospace and Electronic Systems, vol. AES-7, No. 6, Nov. 1971, p. 1087-1092.
M.H. Ackroyd and F. Ghani, "Optimum Mismatched Filters for Sidelobe Suppression", IEEE Trans. Aerospace and Electronic Systems, vol. AES-9, No. 2, Mar. 1973, pp. 214-218.
S. Treitel and E. A. Robinson, "The Design of High-Resolution Digital Filters", IEEE Trans Geoscience Electronics, vol. 4, No. 1, Jun. 1965, pp. 25-38.
R.M. Nuthalapati, "Design of mismatched filters for long binary codes", 2008 IEEE, downloaded from IEEE Xplore.

* cited by examiner

*Primary Examiner* — Scott Sun
(74) *Attorney, Agent, or Firm* — Howard IP Law Group, PC

(57) ABSTRACT

A method for determining filter coefficients for a mismatched filter is disclosed. The method includes generating a code sequence having a code length, determining a length of the filter, and performing a modified least mean squares (LMS) algorithm. The length of the filter corresponds to coefficients of a transfer function of the filter, and the length of the filter is not equal to the code length. The filter coefficients are iteratively adjusted in the LMS algorithm until an error signal for each of the filter coefficients is below a threshold value.

20 Claims, 10 Drawing Sheets

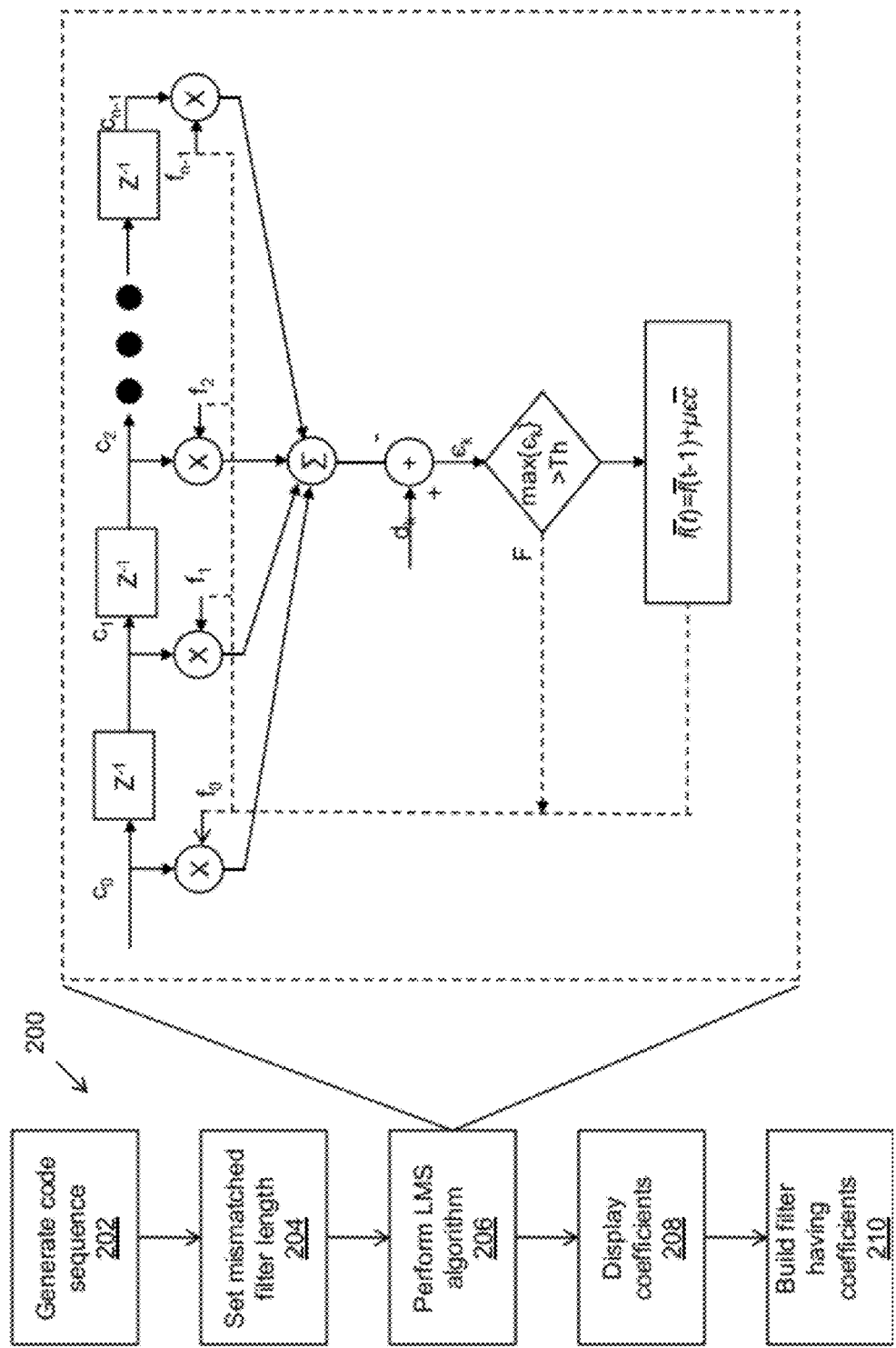

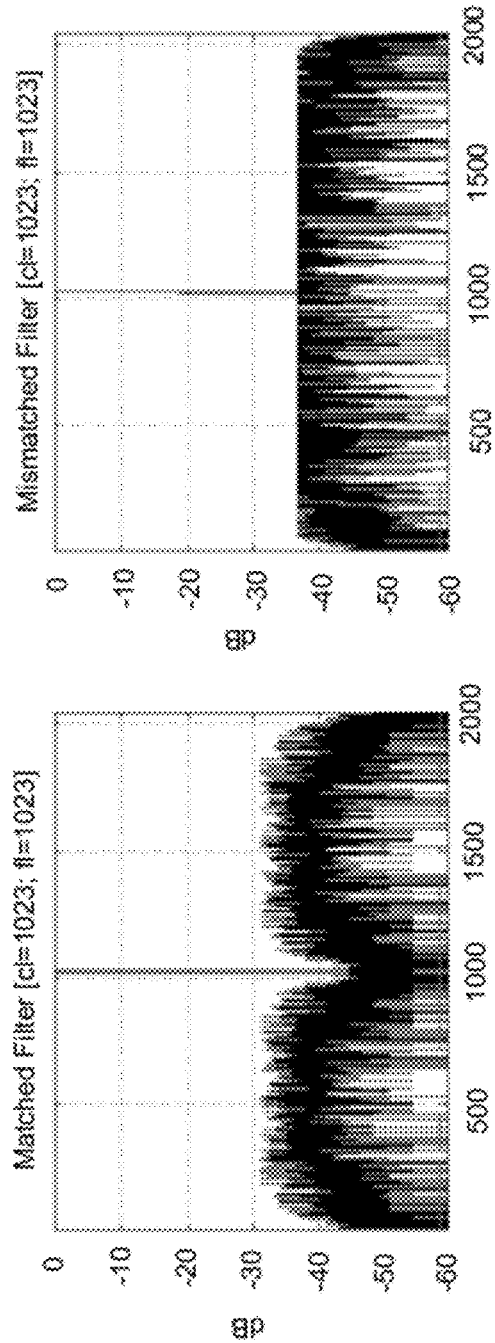
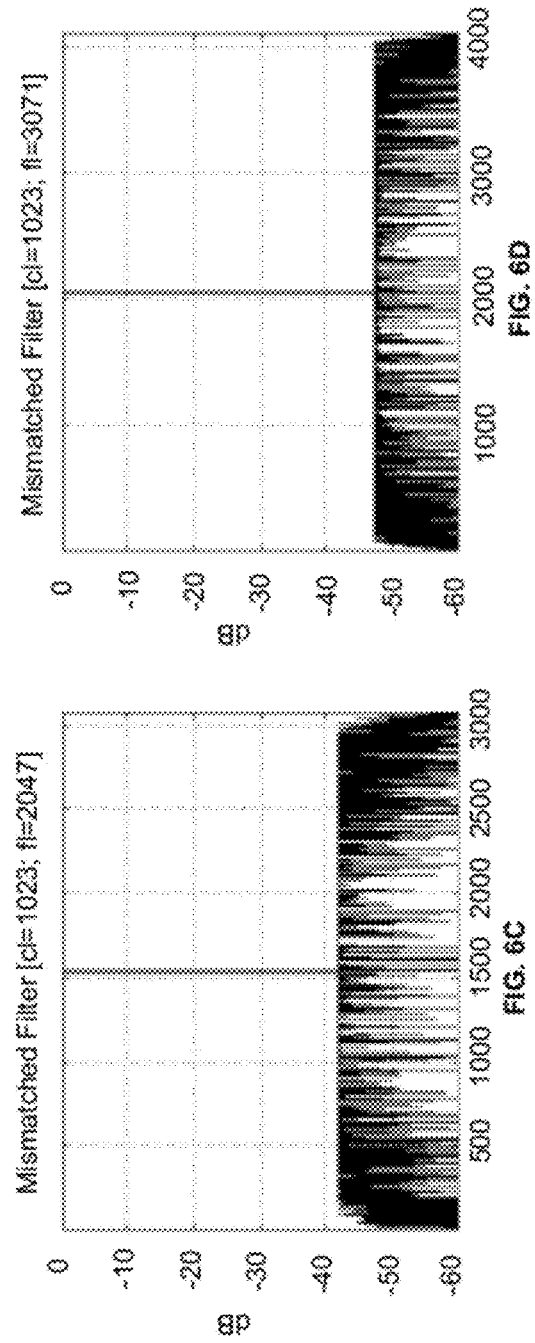
FIG. 6A FIG. 6B FIG. 6C FIG. 6D

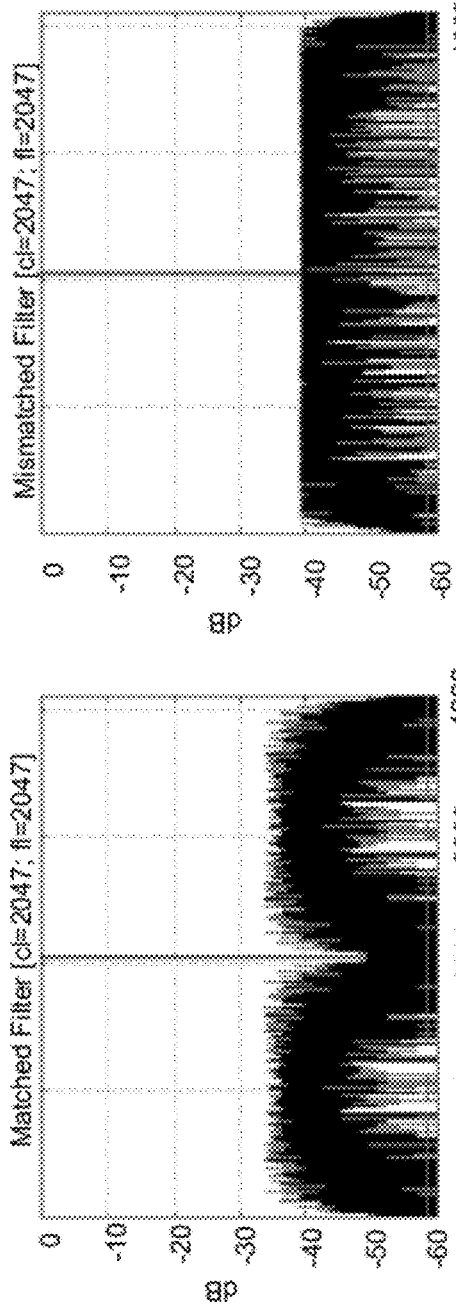
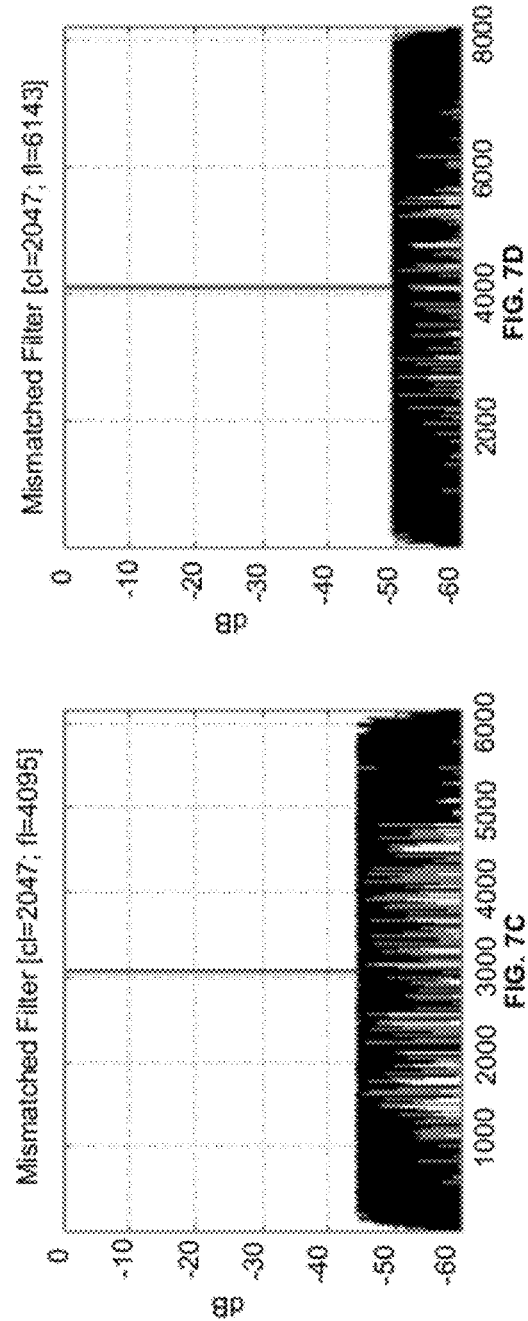
FIG. 7A
FIG. 7B
FIG. 7C
FIG. 7D

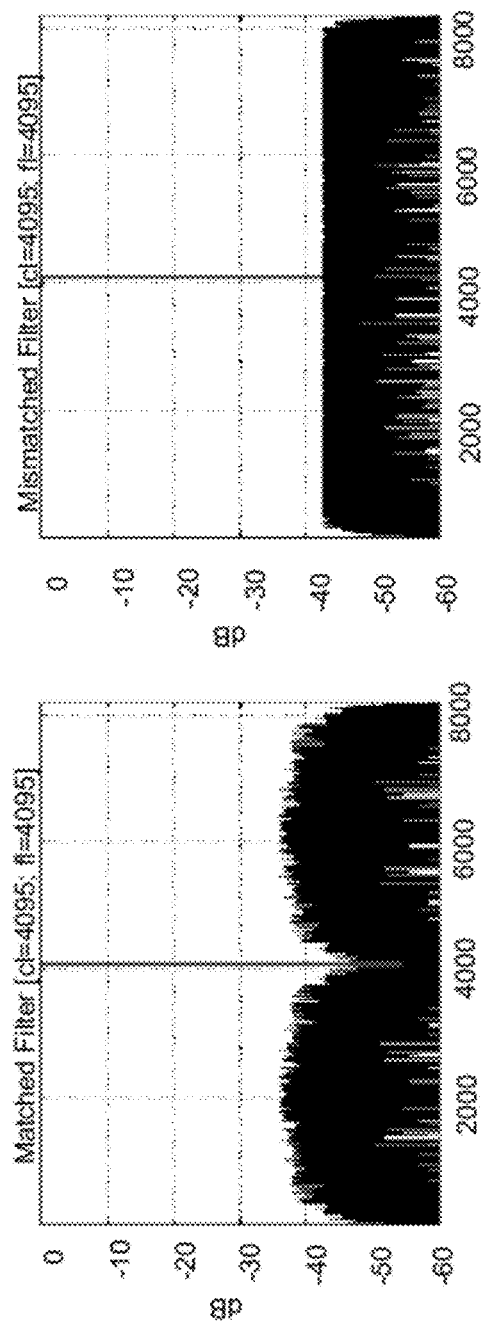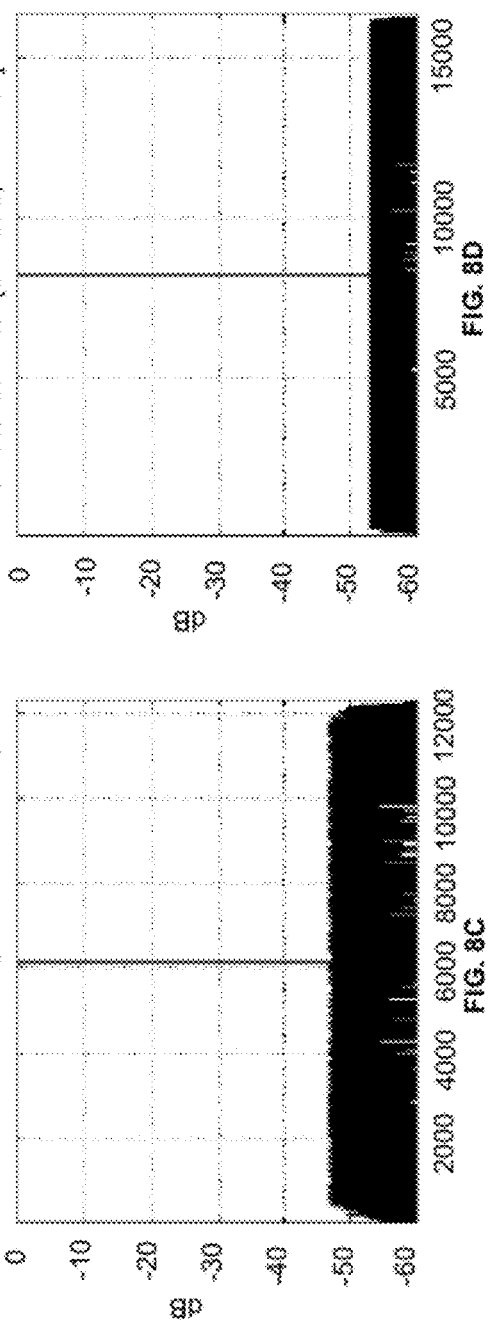

MISMATCHED FILTERS FOR LONG BINARY CODES

FIELD OF DISCLOSURE

The disclosed systems and methods relate to signal processing. More specifically, the disclosed systems and methods relate to signal processing for long binary codes.

BACKGROUND

Pulse compression radar systems are commonly used in many military and non-military applications. These radar systems utilize waveforms that have narrow autocorrelation functions and have time-bandwidth products that are much higher than unity enabling good range resolution (bandwidth dependent) and target detection (energy dependent).

Many pulse compression waveforms are based on maximal length pseudorandom binary codes as binary codes with good autocorrelation properties may be spectrally shaped for spectral containment to avoid interference. To reduce peak sidelobes for binary or pseudorandom number (PRN) codes, least squares or inverse filters are usually implemented as they reduce peak sidelobe levels (PSLs). However, these filters reduce PSLs at the expense of an increase in computational complexity and a decrease in processing gain compared to matched filters.

Several methodologies have been developed to design mismatched filters for binary or PRN codes. One methodology employs a technique called weighted mismatched filtering that iteratively reduces PSLs. However, this method is computationally intensive as it requires matrix inversion for each iteration, and there is no guarantee of convergence.

Another methodology uses linear programming to optimize the reduction of PSLs. While this approach is acceptable for designing filters for shorter code lengths, the computations become prohibitive on general-purpose computers for longer codes, e.g., codes in excess of 1000 or so bits.

Mismatched filter designs based on iterative signal processing algorithms such as Recursive Least Squares (RLS) and Least Mean Squares (LMS) have also been considered. RLS algorithms are computationally intensive compared with LMS algorithms and require more processor memory. Accordingly, RLS methods are not suitable for designing mismatched filters for long binary codes, e.g., codes in excess of 1000 bits.

FIG. 1 illustrates a conventional method 100 of designing a mismatched filter for long binary codes using LMS (Wiener) filtering. As shown in FIG. 1, the method starts with defining a maximal length binary or random sequence at block 102. An ideal autocorrelation function has all zeros except the main lobe response, which is set as the desired response at block 110. However, the autocorrelation function of the binary code under consideration is generally not ideal and has a non-zero sidelobe energy. The autocorrelation function of the code performed at block 104 is used to form a Toeplitz matrix at block 106. Next, the Toeplitz matrix is inverted at block 108. These design steps are usually implemented offline using programs such as MATLAB to perform the matrix inversion at block 108.

The cross-correlation performed at block 112 of the code and desired response is equivalent to code itself because the desired response is made equal to the ideal response (impulse function). As the convolution or correlation of an arbitrary function with an impulse function is the function itself, the binary code can be multiplied with the inverse of the Toeplitz matrix to generate the impulse response of a mismatched filter at block 114. However, to have flexibility in the design, one can choose any desired response (not necessarily ideal). Therefore, a cross-correlation function is usually implemented.

An ideal autocorrelation function will have a zero main-lobe width and zero sidelobe levels. However, practical finite-duration and finite-bandwidth waveforms have non-zero autocorrelation widths and finite sidelobe levels, which limit the target dynamic range. Accordingly, a weaker target may be located and undetected in the range sidelobes thereby affecting the target detection performance.

Thus, an improved method and system for designing mismatched filters is desirable.

SUMMARY

In some embodiments, a system for determining coefficients for a mismatched filter includes a computer readable storage medium and a processor in communication with the computer readable storage medium. The processor is configured to generate a code sequence having a code length, store a length of a the filter in the computer readable storage medium, and perform a modified least mean squares (LMS) algorithm. The length of the filter corresponds to a number of coefficients of the filter. The code length is not equal to the filter length. The filter coefficients are iteratively adjusted in the LMS algorithm until an error signal for each of the filter coefficients is below a threshold value.

In some embodiments, a method for determining filter coefficients for a mismatched filter includes generating a code sequence having a code length, determining a length of the filter, and performing a modified least mean squares (LMS) algorithm. The length of the filter corresponds to coefficients of a transfer function of the filter, and the length of the filter is not equal to the code length. Final filter coefficients are determined by iteratively adjusting the filter coefficients in the LMS algorithm until an error signal for each of the filter coefficients is below a threshold value. A filter having filter coefficients equal to the final filter coefficients is constructed.

The methods may be embodied in a computer readable storage medium encoded with computer program code that may be loaded to a processor, such that when the processor executes the code it performs the method.

BRIEF DESCRIPTION OF THE DRAWINGS

FIG. 2 is a flow diagram of one example of a method for designing a mismatched filter for long binary codes.

FIG. 3 is one example of a recursive algorithm in accordance with the method illustrated in FIG. 2.

FIG. 6A is a graph of the response of a matched filter having a length of 1023 to a binary code of length 1023.

FIG. 6B is a graph of the response of a mismatched filter having a length of 1023 to a binary code of length 1023.

FIG. 6C is a graph of the response of a mismatched filter having a length of 2047 to a binary code of length 1023.

FIG. 6D is a graph of the response of a mismatched filter having a length of 3071 to a binary code of length 1023.

FIG. 7A is a graph of the response of a matched filter having a length of 2047 to a binary code of length 2047.

FIG. 7B is a graph of the response of a mismatched filter having a length of 2047 to a binary code of length 2047.

FIG. 7C is a graph of the response of a mismatched filter having a length of 4095 to a binary code of length 2047.

FIG. 7D is a graph of the response of a mismatched filter having a length of 6143 to a binary code of length 2047.

FIG. 8A is a graph of the response of a matched filter having a length of 4095 to a binary code of length 4095.

FIG. 8B is a graph of the response of a mismatched filter having a length of 4095 to a binary code of length 4095.

FIG. 8C is a graph of the response of a mismatched filter having a length of 8191 to a binary code of length 4095.

FIG. 8D is a graph of the response of a mismatched filter having a length of 12287 to a binary code of length 4095.

DETAILED DESCRIPTION

Figure 1:
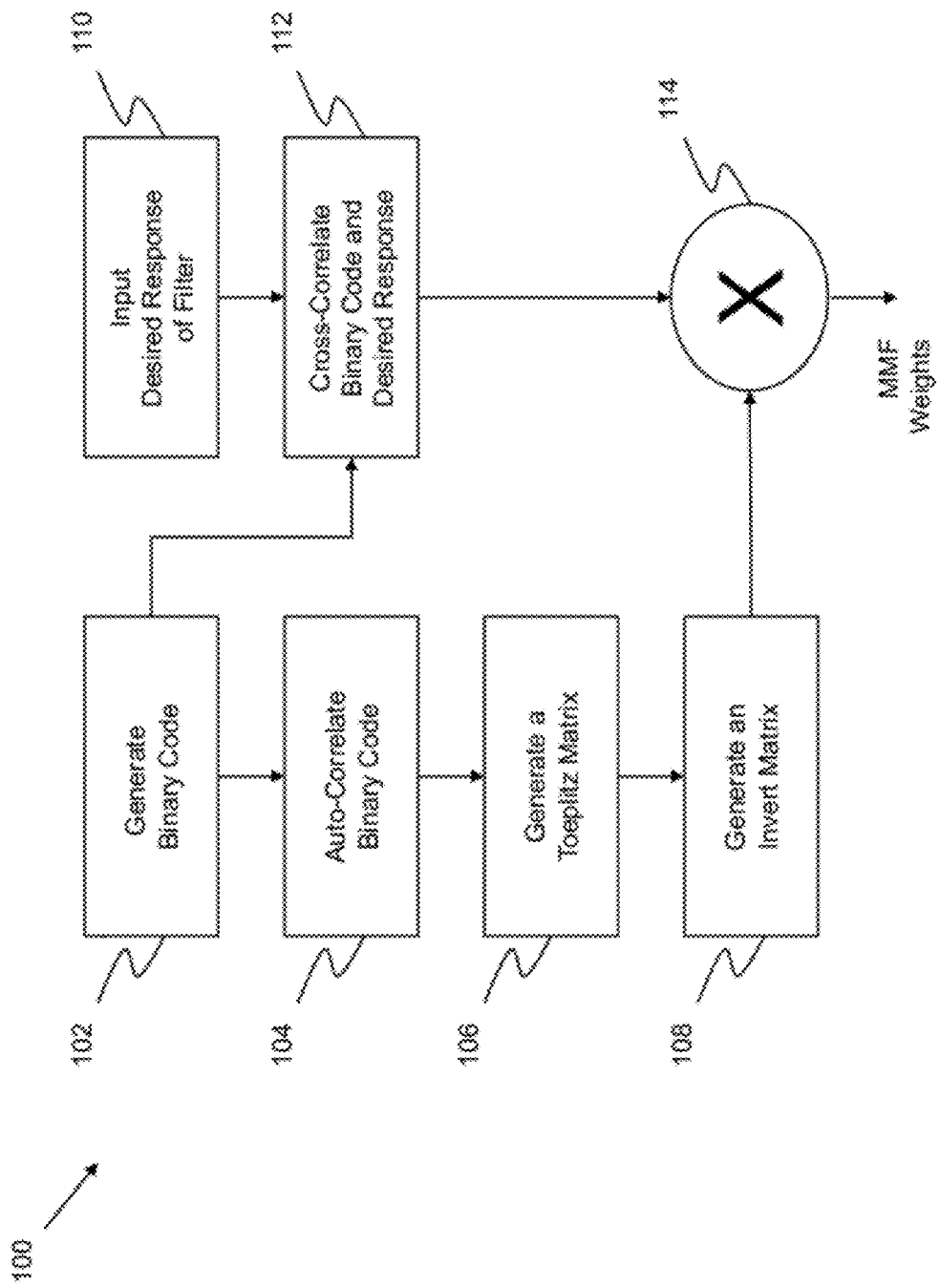
FIG. 1 is a flow diagram of a prior art method of designing a mismatched filter.

Adaptive signal processing is conventionally used in applications such as adaptive beamforming and noise cancellation. For most of these applications, the filter response is adjusted to meet the non-stationary conditions of the channel. The inventor has discovered the through adaptive signal processing mismatched filters may be designed that provide improved sidelobe response for code lengths much greater than 13 as described below.

Unlike in beamforming and noise cancellation applications where the filter response is adjusted to meet non-stationary channel conditions, in designing a mismatched filter the mismatched filter coefficients of the filter transfer function, once optimized for a given code, do not change. Accordingly, the optimization of a mismatched filter may be accomplished off-line. To accomplish the filter design off-line, adaptive signal processing algorithms such as least mean square (LMS) or recursive least squares (RLS) may be used. These algorithms may be performed using a software package such as MATLAB, GNU Octave, Scilab, or the like.

In an adaptive system, there is an input signal and a desired output response. The desired response in this case is a pulse compression output with desired sidelobes. In the method disclosed herein, the coefficients of the filter transfer function are iterated until the desired response is reached. Unlike matrix inversion techniques described above, the improved method enables the design of a filter to be stopped at any time after the desired response is reached. Accordingly, this method advantageously avoids matrix inversion and may be implemented for larger code lengths with convergence.

FIG. 2 is a flow diagram illustrating one example of a method 200 of designing a mismatched filter. As shown in FIG. 2, a code sequence is generated at block 202. At block 204, the length of the mismatched filter, e.g., number of coefficients of the transfer function, is determined. The length of the mismatched filter may be selected by a designer and, in embodiments where the designing is performed by a system, the designer may enter the length of the mismatched filter in a computer where the mismatched filter length is stored in a computer readable storage medium.

A modified least mean squares (LMS) algorithm is performed at block 206. FIG. 3 illustrates one example of the modified least mean squares (LMS) algorithm 300 using a tapped delay-line or finite-impulse response (FIR) filter configuration to design a mismatched filter. The input into the modified LMS algorithm 300 may be a code sequence, such as $c_n\{0 \leq n \leq N-1\}$. The mismatched filter weights may be denoted as $f_n\{0 \leq n \leq M-1\}$. The length of the mismatched filter is selected such that $M \geq N$. If $M > N$, and the input sequence $c_n$ may be appended with zeros to make its length equal to the filter length, M. The desired cross-correlation output of the input sequence and the filter weights is denoted by $d_n\{0 \leq n \leq N-1\}$. Initially, the filter weights, $f_n$, are cleared to zero. The desired cross-correlation output is set as an ideal function with all values being equal to zero except for the mainlobe. The error signal vector may be computed as follows:

$$\overline{\epsilon} = \overline{d} - \overline{f}\overline{c} \qquad \text{Eq. 1}$$

Note that the error signal is a vector as it is being computed for each new sample input of the code sequence. As the number of iterations of the modified LMS algorithm is much larger than the code length, the code sequence and the desired sequence are repeated until convergence is obtained. If any element of the error sequence exceeds a predefined threshold $T_h$, weights may be updated for $n^{th}$ iteration as follows:

$$\overline{f}_n = \overline{f}_{n-1} + \mu\epsilon[M-1]\overline{c} \qquad \text{Eq. 2}$$

Where, $\mu$ is a least mean squares algorithm adaptation constant.

The value of $\mu$ may be selected by the designer to provide the desired tradeoff between convergence time of the algorithm 300 and accuracy of the filter. For example, if the designer determines that accuracy of the mismatched filter, e.g., a smaller error, is more important than a faster convergence time, then the value of $\mu$ is selected to be a small value. However, if the designer wants the algorithm 300 to converge faster and is less concerned about filter accuracy, then the value of $\mu$ may be set at a larger value.

Unlike a conventional LMS algorithm, the conditional adaptation of filter weights takes place based on the magnitude of the error in the modified LMS algorithm. No adaptation of filter coefficients takes place if the maximum error of the error vector stays below the threshold. The threshold, $T_h$, may be updated for each repetition of the code sequence to obtain faster convergence, as follows:

$$T_h = \max[\overline{\epsilon}]\delta \qquad \text{Eq. 3}$$

Where, $\delta$ is a constant less than unity.

The initial threshold $T_h$ can be set as a small constant that is greater than zero. For each iteration of the method 200, no adjustment of the coefficients is performed if the maximum value of the error is less than the threshold value. Conversely, the filter coefficients are adjusted if the error exceeds the threshold value. The magnitude of the adjustment may be controlled by $\mu$, which may have a small value that is inversely proportional to the input power of the code sequence. The iterative method 200 may be slow compared to an RLS algorithm, however, this is not a significant drawback as many mismatched filters may be designed offline so fast convergence is not required. Additionally, the improved method 200 requires less computer memory than an RLS algorithm for the filter design.

Once convergence is achieved, the performance differences of the filters designed using RLS and the inventive method are minimal. The filter coefficients may be displayed to a user at block 208. The improved method 200 has a significant advantage over RLS algorithms in that it may be applied to design mismatched filters of thousands of taps thereby supporting pulse compression radars with large time-bandwidth products.

As mentioned above, the modified LMS algorithm 300 may be performed in a software package such as MATLAB. For example, the binary code under consideration may be loaded into the MATLAB workspace. The mismatched filter size may be selected, and the filter coefficients along with the error vector, $\bar{\epsilon}$, may be initialized at zero. The values of $\mu$ and $\delta$ may also be initialized.

MATLAB may then compute the error for the current binary code of the modified LMS algorithm. The binary code may be shifted into a shift register, and the error of the modified LMS algorithm may be again computed until the error vector, $\bar{\epsilon}$, is filled with values. If the maximum value of error exceeds a predetermined threshold, then the filter coefficients are adjusted and the error of the modified algorithm is again calculated. Otherwise, if the maximum error is below the predetermined threshold, then the values of the filter coefficients are maintained and the peak side lobe levels of the mismatched filter are determined. The algorithm may be stopped when the desired peak sidelobe level is obtained. A filter having a transfer function with the calculated coefficients is constructed at block 210.

The mismatch filter loss (MMFL) may be estimated as a combination of one or more components. The mismatch loss due to uncompensated Doppler may be noted as a drop in the pulse compression output, compared to the matched filter output as denoted in the following equation:

$$MMFL = \frac{\left(\sum_{i=1}^{N} c_i c_i^*\right)\left(\sum_{i=1}^{N} d_i d_i^*\right)}{\left|\left(\sum_{i=1}^{N} c_i d_i^*\right)\right|^2} \quad \text{Eq. 4}$$

Where, c and d respectively represent transmit and received (Doppler shifted) signals; and N represents the signal length.

The loss ratio is 0 dB if the there is no Doppler shift, e.g., if d=c. If there is no Doppler shift and the mismatch is due to the sidelobe suppression filter, then Equation 4 may be modified to include arbitrary mismatched filter lengths, which may be denoted by the following equation:

$$MMFL = \frac{\left(\sum_{i=1}^{N} c_i c_i^*\right)\left(\sum_{i=1}^{M} f_i f_i^*\right)}{\left|\left(\sum_{i=\left(\frac{M-N}{2}\right)+1}^{\left(\frac{M+N}{2}\right)} c_i f_i^*\right)\right|^2} \quad \text{Eq. 5}$$

Where,

M represents the length of the mismatched filter; and f represents coefficients of the mismatched filter.

The mismatch loss that is contributed by both uncompensated Doppler and the sidelobe suppression filtering may be estimated by the following equation:

$$MMFL = \frac{\left(\sum_{i=1}^{N} d_i d_i^*\right)\left(\sum_{i=1}^{M} f_i f_i^*\right)}{\left|\left(\sum_{i=\left(\frac{M-N}{2}\right)+1}^{\left(\frac{M+N}{2}\right)} d_i f_i^*\right)\right|^2} \quad \text{Eq. 6}$$

One should note that a reduction in pulse compression output may not be a true indication of mismatch loss for sidelobe suppression filtering. However, a reduction in pulse compression output may be used if the mismatch is entirely due to Doppler shifting.

EXAMPLES

Figure 11:
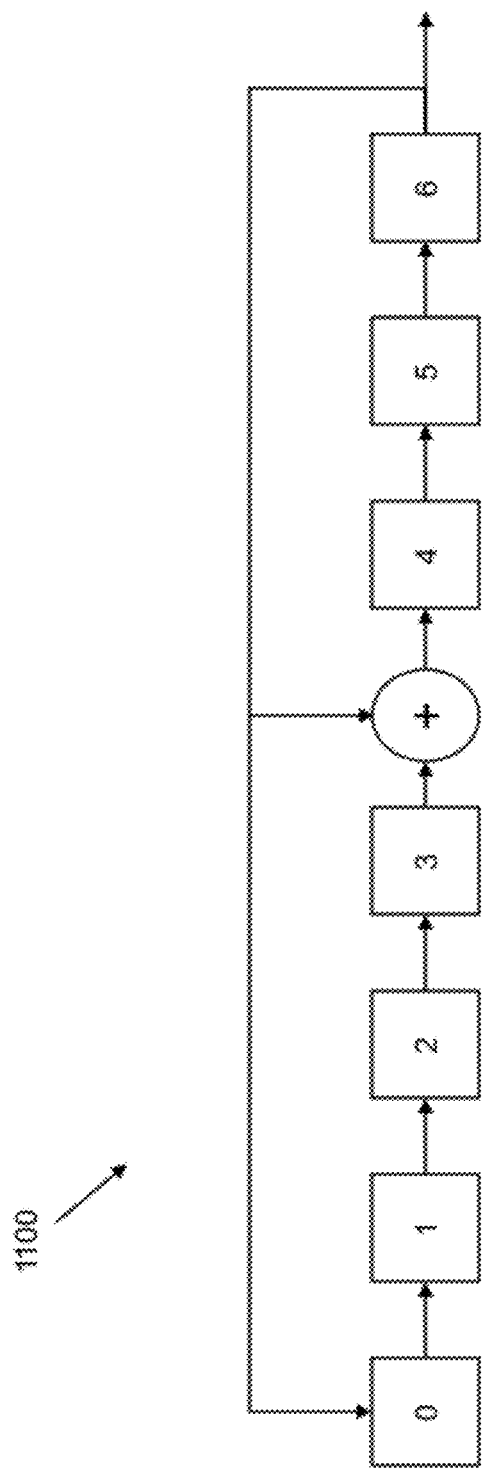
FIG. 11 is a block diagram of a shift register configured to generate a pseudorandom sequence in accordance with the present disclosure.

Several examples of various mismatched filters designed in accordance with the disclosed method are now described. As described above, maximal length binary codes may be used in the design of mismatched filters. These binary codes may be generated using a shift register 1100 with feedback connections as illustrated in FIG. 11. An n-bit shift register may be used to generate a $2^{n-1}$ bit pseudorandom sequence. For example, a 7-bit shift register could have a configuration with a code generator polynomial as $x^7+x^4+1$.

Figure 4:
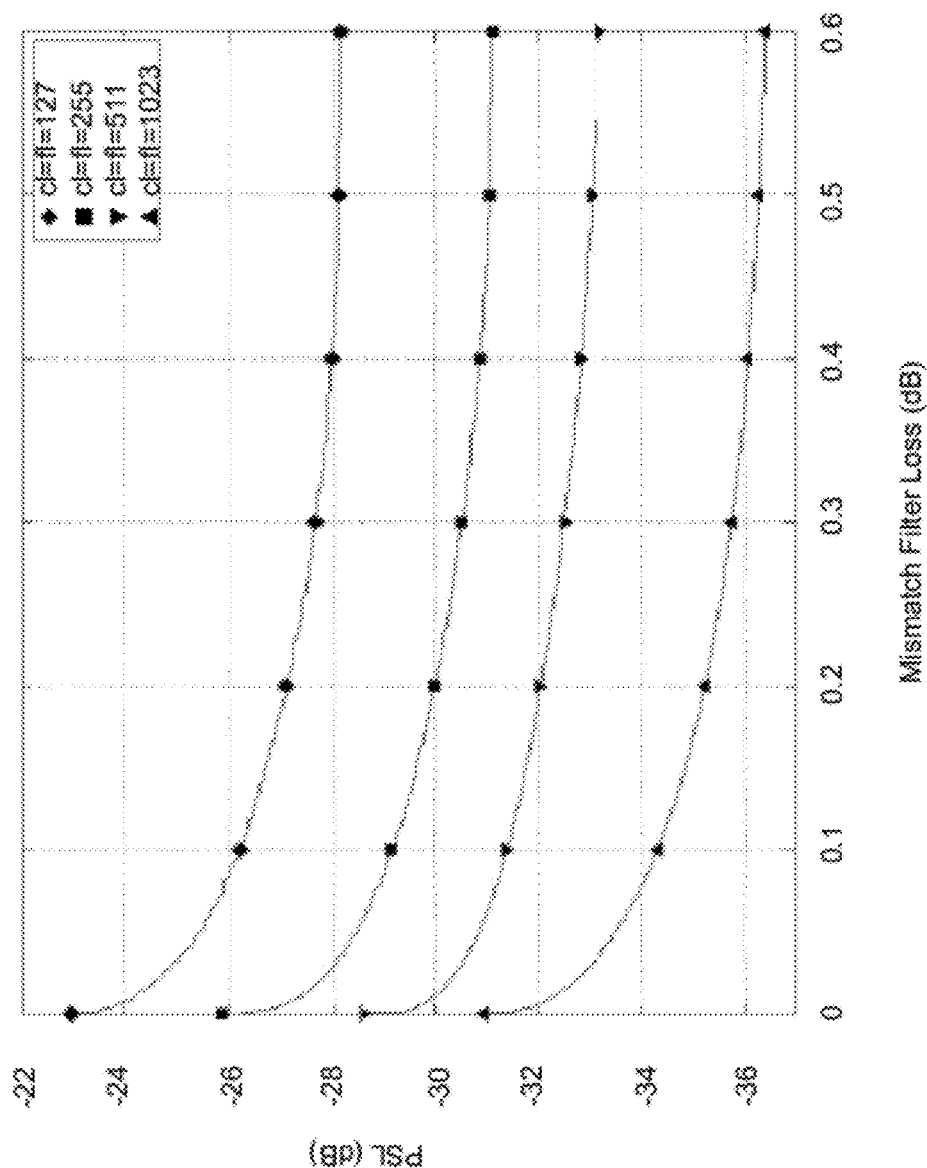
FIG. 4 is a graph of peak sidelobe (PSL) versus loss characteristics of short maximal length binary codes of lengths 127, 255, 511, and 1023.
Figure 5:
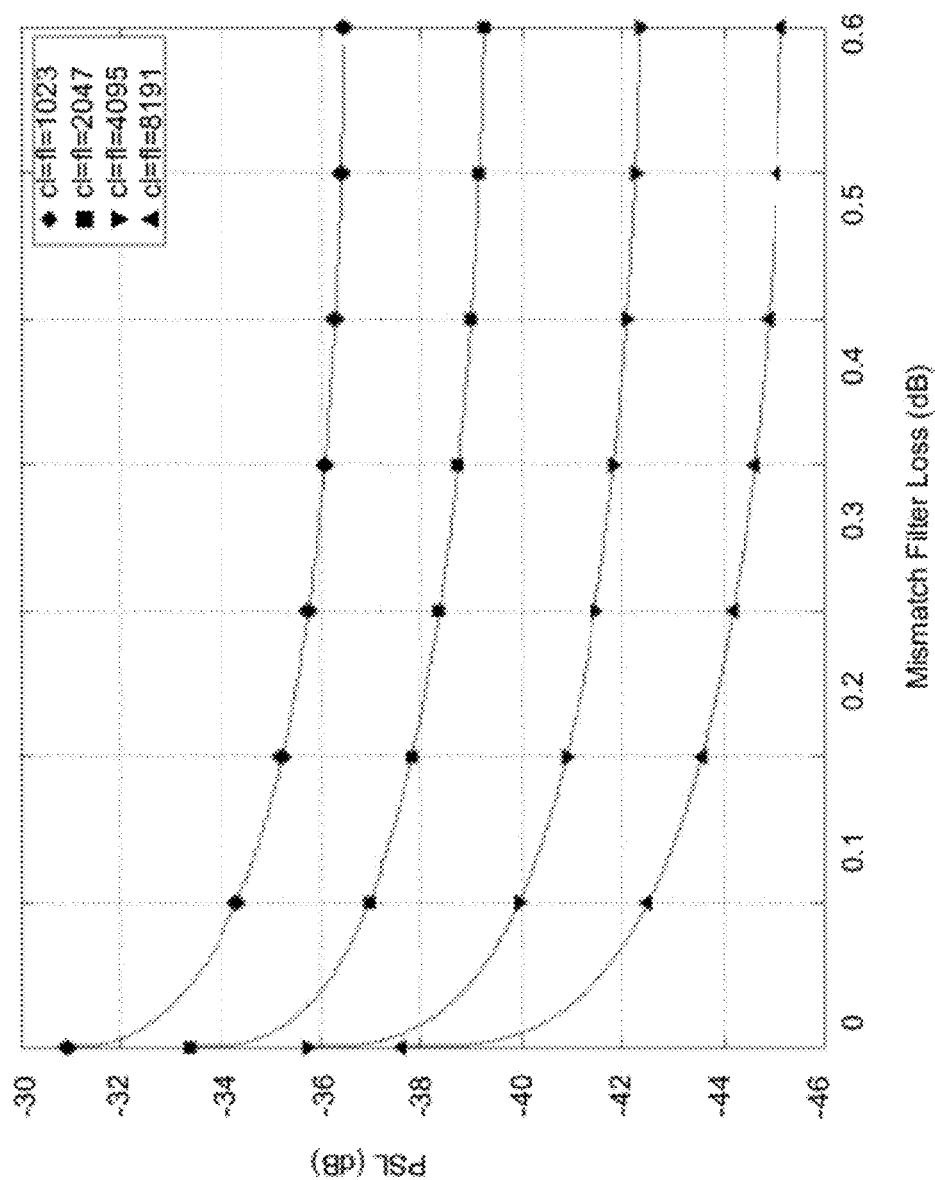
FIG. 5 is a graph of PSL versus loss characteristics for maximal length binary codes of lengths 1023, 2047, 4095, and 8191.
Figure 9A:
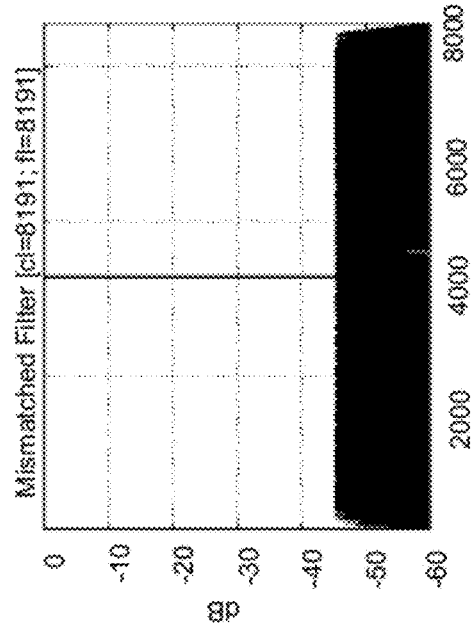
FIG. 9A is a graph of the response of a matched filter having a length of 8191 to a binary code of length 8191.
Figure 9B:
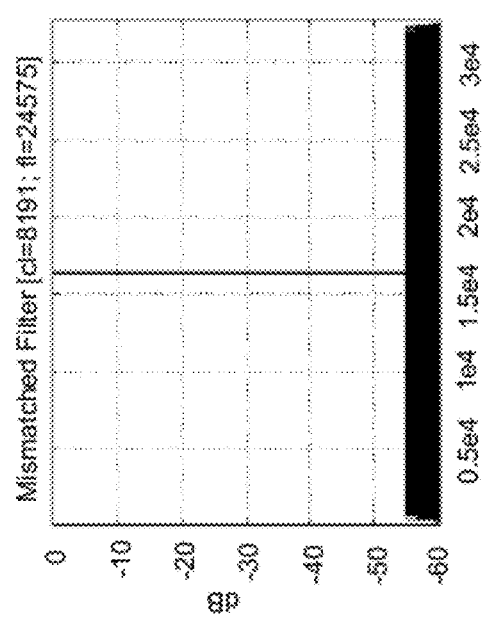
FIG. 9B is a graph of the response of a mismatched filter having a length of 8191 to a binary code of length 8191.
Figure 9C:
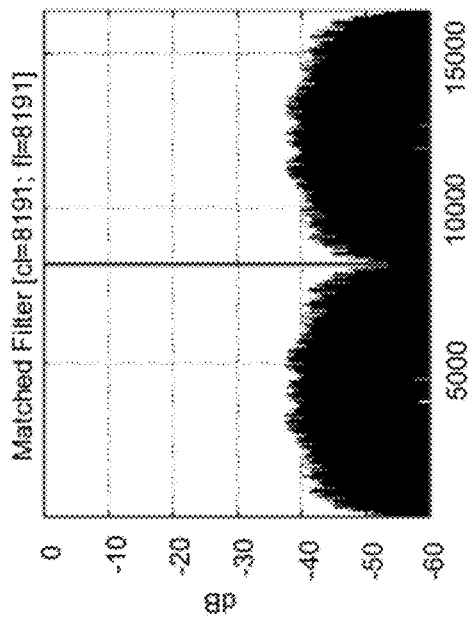
FIG. 9C is a graph of the response of a mismatched filter having a length of 16383 to a binary code of length 8191.
Figure 9D:
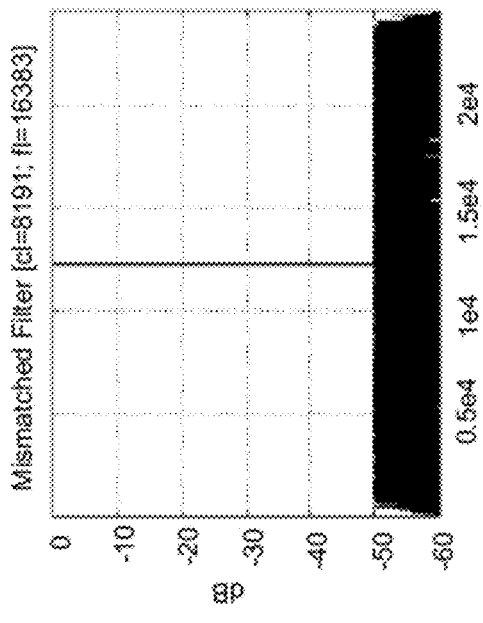
FIG. 9D is a graph of the response of a mismatched filter having a length of 24575 to a binary code of length 8191.

FIG. 4 illustrates a graph of the peak sidelobes versus loss characteristics of short maximal length binary codes of a mismatched filter having a length equal to the length of the binary code. FIG. 5 illustrates a graph of the peak sidelobes versus loss characteristics of maximal length binary codes of lengths 1023, 2047, 4095, and 8191, which are equal to the lengths of the mismatched filter. As shown in FIGS. 4 and 5, the best possible peak sidelobe level reaches an asymptotic level.

Accordingly, a mismatched filter may be designed that minimizes the mismatch loss for a given peak sidelobe level requirement. If the length of the mismatched filter is made longer than the length of the matched filter, further reduction in peak sidelobe levels may be achieved at the expense of increased mismatched filter loss.

FIGS. 6A-9D illustrate the matched filter and mismatched filter responses for several maximal length binary codes having lengths of 1023, 2047, 4095, and 8191. As illustrated, the peak sidelobe level drops further for increasing mismatched filter length. Accordingly, it may be stated that increasing the mismatched filter length indefinitely would not proportionately reduce the peak sidelobe level as filter loss increases with increasing filter length.

Figure 10:
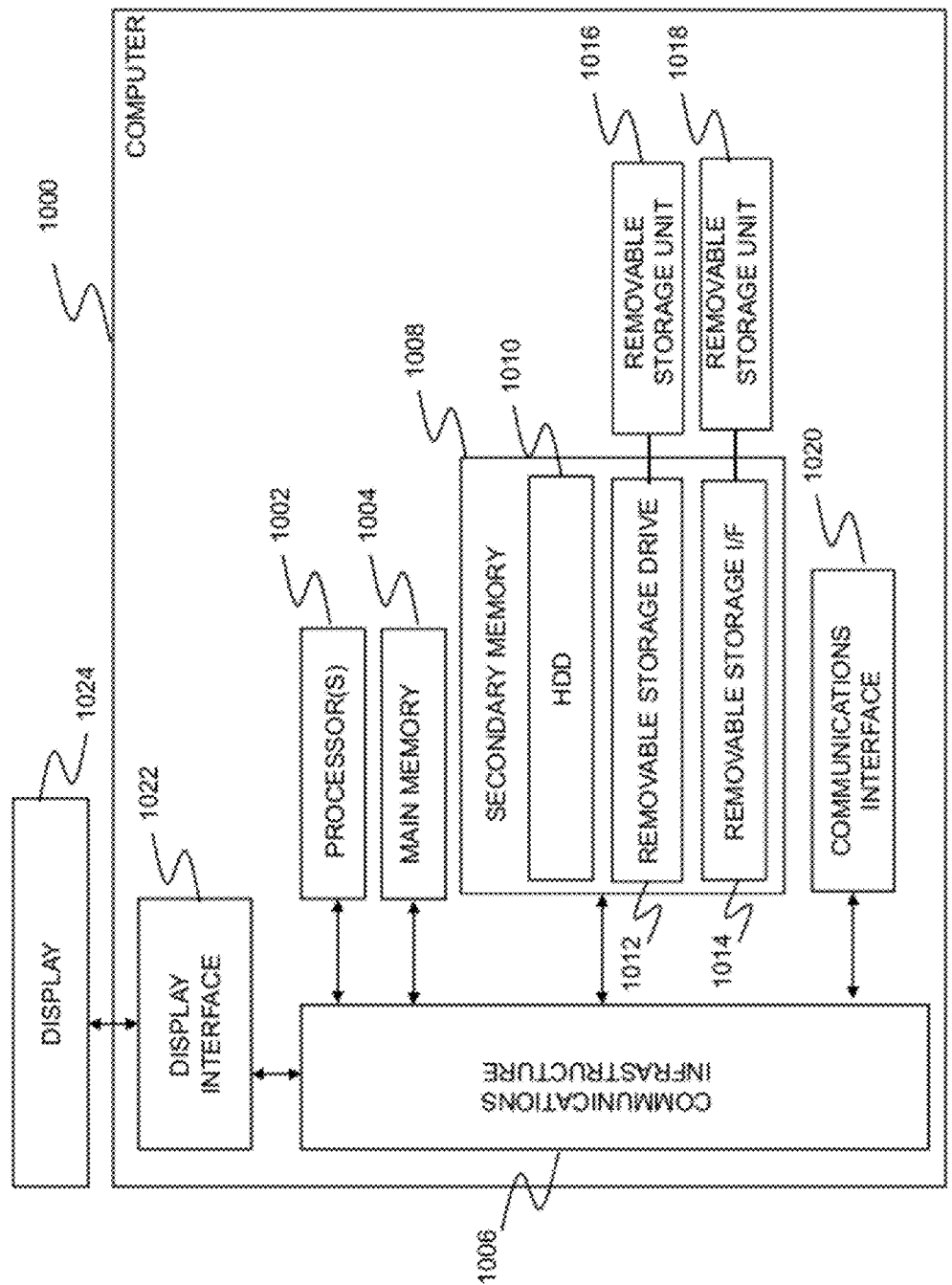
FIG. 10 is a block diagram of one example of a computer architecture configured to design a mismatched filter in accordance with the present disclosure.

The system and method may be implemented using hardware, software, or a combination thereof and may be implemented in one or more computer systems or other processing systems. In one embodiment, the system and method are carried out in a computer system as illustrated in FIG. 10. Computer system 1000 may include one or more processors, such as processor(s) 1002. The processor(s) 1002 is connected to a communication infrastructure 1006 (e.g., a communications bus, cross-over bar, or network). Various software embodiments are described in terms of this exemplary computer system. After reading this description, it will be apparent to one skilled in the art how to implement the method using other computer systems or architectures.

Computer system 1000 can include a display interface 1022 that forwards graphics, text, and other data from the communication infrastructure 1006 (or from a frame buffer not shown) for display on the display unit 1024.

Computer system also includes a main memory 1004, such as a random access (RAM) memory, and may also include a secondary memory 1008. The secondary memory 1008 may include, for example, a hard disk drive 1010 and/or removable storage drive 1012, representing a floppy disk drive, a magnetic tape drive, an optical disk drive, or the like. The removable storage drive 1012 reads from and/or writes to a removable storage unit 1016 in a manner understood by those skilled in the art. Removable storage unit 1012 represents a floppy disk, magnetic tape, optical disk, or the like, which may be read by and written to by removable storage drive 1012. As will be appreciated, the removable storage unit 1016 may include a computer usable storage medium having stored therein computer software and/or data.

In some embodiments, secondary memory 1008 may include other similar devices for allowing computer programs or other instructions to be loaded into computer system 1000. Such devices may include, for example, a removable storage unit 1018 and a corresponding interface 1018. Examples of such units 1018 and interfaces 1014 may include a program cartridge and cartridge interface (such as that found in video game devices), a removable memory chip (such as an erasable programmable read only memory (EPROM), or programmable read only memory (PROM)) and associated socket, and other removable storage units 1018 and interfaces 1014, which allow software and data to be transferred from the removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a Personal Computer Memory Card International Association (PCMCIA) slot and card, or the like. Software and data transferred via communications interface 1020 are in the form of signals, which may be electronic, electromagnetic, optical, or other signals capable of being received by communications interface 1020. These signals are provided to communications interface 1020 via a communications path or channel. The channel may be implemented using wire or cable, fiber optics, a telephone line, a cellular link, a radio frequency (RF) link or other communication channels.

In this document, the terms "computer program medium" and "computer readable medium" are to refer to media such as removable storage units 1016, 1018, a hard disk installed in hard disk drive 1010. These computer program products provide software to computer system 1000. Computer programs (also referred to as computer control logic) may be stored in main memory 1004 and/or secondary memory 1008. Computer programs may also be received via communications interface 1020. Such computer programs, when executed by a processor(s) 1002, enable the computer system 1000 to perform the features of the method discussed herein.

In an embodiment where the invention is implemented using software, the software may be stored in a computer program product and loaded into computer system 1000 using removable storage drive 1012, hard drive 1010, or communications interface 1006. The software, when executed by processor(s) 1002, causes the processor(s) 1002 to perform the functions of the method described herein.

In another embodiment, the method is implemented primarily in hardware using, for example, hardware components such as application specific integrated circuits (ASICs). Implementation of the hardware state machine so as to perform the functions described herein will be apparent to persons skilled in the art. In yet another embodiment, the method is implemented using a combination of both hardware and software.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method for determining filter coefficients for a mismatched filter, the method comprising:
    a) generating a code sequence having a code length;
    b) determining a length of the filter, the length of the filter corresponding to coefficients of a transfer function of the filter, the length of the filter not being equal to the code length;
    c) appending zeroes to an end of the code sequence to increase the code length to equal the filter length;
    d) determining final filter coefficients by performing a modified least mean squares (LMS) algorithm in which the filter coefficients are iteratively adjusted until an error signal for each of the filter coefficients is below a threshold value; and
    e) building a filter having coefficients equal to the final filter coefficients.

2. The method of claim 1, wherein the LMS algorithm includes:
    i) initializing the filter coefficients;
    ii) computing the error signal for each of the filter coefficients;
    iii) comparing each of the error signals to the threshold value;
    iv) updating the filter coefficients if one of the error signal is exceeds the threshold value; and
    v) repeating steps ii) through iv) until each of the error signals is below the threshold value.

3. The method of claim 2, wherein the error signals are computed according to:

$$\bar{\epsilon} = \bar{d} - \bar{f}\bar{c},$$

where,
$\bar{\epsilon}$ is an error signal vector;
$\bar{d}$ is a desired cross correlation vector;
$\bar{f}$ is a filter coefficient vector; and
$\bar{c}$ is a code vector.

4. The method of claim 2, wherein the filter coefficients are updated according to:

$$\bar{f}_n = \bar{f}_{n-1} + \mu \epsilon[M-1]\bar{c},$$

where,
$\bar{f}_n$ is a new filter coefficient vector;
$\bar{f}_{n-1}$ is a previous filter coefficient vector;
$\mu$ is a least mean squares constant;
$\epsilon[M-1]$ is a last value of the error signal vector;

M is the length of the filter; and $\overline{c}$ is a code vector.

5. The method of claim 2, further comprising updating the threshold value for each iteration of the LMS algorithm according to:

$T_h = \max[\overline{\epsilon}]\delta,$ where,
Th is the threshold value;
$\overline{\epsilon}$ is an error signal vector; and
$\delta$ is a constant less than unity.

6. The method of claim 1, wherein the code length is greater than 13.

7. The method of claim 1, wherein the modified LMS algorithm is performed by a computer.

8. The method of claim 1, further comprising storing each of the calculated error signals in a computer readable storage medium.

9. The method of claim 1, further comprising displaying the filter coefficients on a monitor.

10. The method of claim 1, wherein the code sequence is a pseudorandom number generated by a shift register.

11. A computer readable storage medium encoded with program code, wherein when the program code is executed by a processor, the processor performs a method, the method comprising:
  a) generating a code sequence, the code sequence having a code length;
  b) receiving, as an input, a length of a filter, the filter length corresponding to a number of coefficients of a transfer function of the filter, the filter length not being equal to the code length; and
  c) performing a modified least mean squares (LMS) algorithm in which filter coefficients are iteratively adjusted until an error signal for each of the filter coefficients is below a threshold value,
wherein the filter coefficients are adjusted according to:

$\overline{f}_n = \overline{f}_{n-1} + \mu\epsilon[M-1]\overline{c},$ where
$\overline{f}_n$ is a new filter coefficient vector;
$\overline{f}_{n-1}$ is a previous filter coefficient vector;
$\mu$ is a least mean squares constant;
$\epsilon[M-1]$ is a last value of the error signal vector;
M is the length of the filter; and
$\overline{c}$ is the code vector.

12. The computer readable storage medium of claim 11, wherein the LMS algorithm includes:
  i) initializing the filter coefficients;
  ii) computing the error signal for each of the filter coefficients;
  iii) comparing each of the error signals to the threshold value;
  iv) updating the filter coefficients if one of the error signal is exceeds the threshold value; and
  v) repeating steps ii) through iv) until each of the error signals is below the threshold value.

13. The computer readable storage medium of claim 12, wherein the error signals are computed according to:

$\overline{\epsilon} = \overline{d} - \overline{f}\overline{c},$ where,
$\overline{\epsilon}$ is an error signal vector;
$\overline{d}$ is a desired cross correlation vector;
$\overline{f}$ is a filter coefficient vector; and
$\overline{c}$ is a code vector.

14. The computer readable storage medium of claim 11, wherein the method further comprises:

appending zeroes to an end of the code sequence such that the code length is equal to the length of the filter.

15. The computer readable storage medium of claim 12, wherein the method further comprises updating the threshold value for each iteration of the LMS algorithm according to:

$T_h = \max[\overline{\epsilon}]\delta,$ where,
Th is the threshold value;
$\overline{\epsilon}$ is an error signal vector; and
$\delta$ is a constant less than unity.

16. A system for determining coefficients for a filter, the system comprising:
  a computer readable storage medium; and
  a processor in communication with the computer readable storage medium, the processor configured to:
    a) generate a code sequence having a code length;
    b) store a length of a the filter in the computer readable storage medium, the length of the filter corresponding to a number of coefficients of the filter, the code length not being equal to the filter length;
    c) perform a modified least mean squares (LMS) algorithm in which filter coefficients are iteratively adjusted until an error signal for each of the filter coefficients is below a threshold value, and
    d) update the threshold value for each iteration of the LMS algorithm according to:

$T_h = \max[\overline{\epsilon}]\delta,$ where,
Th is the threshold value;
$\overline{\epsilon}$ is an error signal vector; and
$\delta$ is a constant less than unity.

17. The system of claim 16, wherein the processor is configured to:
  i) initialize the filter coefficients;
  ii) compute the error signal for each of the filter coefficients;
  iii) compare each of the error signals to the threshold value;
  iv) update the filter coefficients if one of the error signal is exceeds the threshold value; and
  v) repeat steps ii) through iv) until each of the error signals is below the threshold value.

18. The system of claim 17, wherein the error signal of the filter is computed according to:

$\overline{\epsilon} = \overline{d} - \overline{f}\overline{c},$ where,
$\overline{\epsilon}$ is an error signal vector;
$\overline{d}$ is a desired cross correlation vector;
$\overline{f}$ is a filter coefficient vector; and
$\overline{c}$ is a code vector.

19. The system of claim 16, wherein the processor is configured to: append zeroes to an end of the code sequence such that the code length is equal to the length of the filter.

20. The system of claim 17, wherein the filter weights are updated according to:

$\overline{f}_n = \overline{f}_{n-1} \mu\epsilon[M-1]\overline{c},$ where,
$\overline{f}_n$ is a new filter coefficient vector;
$\overline{f}_{n-1}$ is a previous filter coefficient vector;
$\mu$ is a least mean squares constant;
$\epsilon[M-1]$ is a last value of the error signal vector;
M is the length of the filter; and
$\overline{c}$ is a code vector.

* * * * *

UNITED STATES PATENT AND TRADEMARK OFFICE
CERTIFICATE OF CORRECTION

PATENT NO. : 8,380,770 B1
APPLICATION NO. : 12/463794
DATED : February 19, 2013
INVENTOR(S) : Rao Nuthalapati Page 1 of 1

It is certified that error appears in the above-identified patent and that said Letters Patent is hereby corrected as shown below:

Column 8, line 46, claim 2, the word "is" should be deleted.
Column 9, line 52, claim 12, the word "is" should be deleted.
Column 10, line 17, claim 16, the word "a" should be deleted.

Signed and Sealed this
Second Day of April, 2013

Teresa Stanek Rea
*Acting Director of the United States Patent and Trademark Office*